United States Patent [19]

Dekraker et al.

[11] Patent Number: 4,956,492

[45] Date of Patent: Sep. 11, 1990

[54] DIALKYL FUMARATE - VINYL ACETATE COPOLYMERS USEFUL AS DEWAXING AIDS

[75] Inventors: Abraham R. Dekraker, Sarnia, Canada; David J. Martella, Plainsboro, N.J.

[73] Assignee: Exxon Research and Engineering Co., Florham Park, N.J.

[21] Appl. No.: 944,545

[22] Filed: Dec. 19, 1986

Related U.S. Application Data

[62] Division of Ser. No. 589,536, Mar. 14, 1984, Pat. No. 4,670,130.

[51] Int. Cl.$^5$ ............................................. C07C 69/60
[52] U.S. Cl. ...................................... 560/190; 208/33; 526/325
[58] Field of Search ................................ 560/190, 201

[56] References Cited

U.S. PATENT DOCUMENTS

| | | | |
|---|---|---|---|
| 3,729,296 | 4/1973 | Miller | 44/62 |
| 3,765,849 | 10/1973 | Ilnyckyj et al. | 44/62 |
| 4,377,647 | 3/1983 | Durbin et al. | 523/518 |
| 4,470,421 | 9/1984 | Southwick et al. | 560/190 X |
| 4,515,974 | 5/1985 | Zecher et al. | 560/190 X |

*Primary Examiner*—Werren B. Lone
*Assistant Examiner*—Vera C. Clarke
*Attorney, Agent, or Firm*—Vivienne T. White; Robert A. Maggio; Myron B. Kapustij

[57] ABSTRACT

Copolymers of dialkyl fumarate and vinyl acetate having Specific Viscosities of at least 2.5 at 2% polymer concentration in xylene at 40° C., and wherein at least 50 wt. % of said alkyl groups are $C_{20}$ to $C_{24}$, are useful as dewaxing aids, particularly in propane dewaxing.

4 Claims, No Drawings

DIALKYL FUMARATE - VINYL ACETATE COPOLYMERS USEFUL AS DEWAXING AIDS

This is a division, of application Ser. No. 589,536, filed 3/14/84, now U.S. Pat. No. 4,670,130.

BACKGROUND OF THE INVENTION

1. Field Of The Invention

The invention relates to copolymers of dialkyl fumarate and vinyl acetate, wherein a major weight proportion of said alkyl groups are $C_{20}$ to $C_{24}$ alkyl groups, which copolymers are useful in dewaxing oil, particularly in propane dewaxing processes.

2. Description Of The Prior Art

U.S. Pat. No. 3,729,296 discloses copolymers of long chain dialkyl fumarate and vinyl acetate, as a wax crystal modifier, including use as a dewaxing aid.

U.S. Pat. No. 4,377,467 describes the use of different polymers as dewaxing aids including the use of mixtures of different dewaxing aid polymers.

SUMMARY OF THE INVENTION

The present invention represents a further improvement over U.S. Pat. No. 3,729,296 by the finding that forming the copolymer within certain specific viscosity ranges improves the performance of the polymer as a filtration aid in propane dewaxing.

The Copolymer

The dialkyl fumarate will have 50 to 100 wt. %, preferably 70 to 100 wt. % of its alkyl groups in the $C_{20}$ to $C_{24}$ range. The remaining alkyl groups may be either above $C_{24}$ or below $C_{20}$, such as groups derived from tallow alcohols, or even methyl or ethyl alcohols, e.g., see U.S. Pat. No. 3,765,849. Behenyl alcohol is especially preferred for forming the fumarate. The copolymer is formed under nitrogen by a free radical reaction by heating in a solvent the monomers together in about equi-molar proportions, with a free radical initiator, such as a peroxide. However, the overall conditions of time, temperature, peroxide, amounts of solvent, peroxide, etc. are chosen to form polymers having a Specific Viscosity of about 2.5 to 8 or higher, e.g. about 2.7 to 6, preferably 2.7 to 4.5, when measured as a 2 wt. % solution of the copolymer in mixed xylenes at 40° C.

The Oil To Be Dewaxed

Any waxy petroleum oil stock or distillate fraction thereof may be dewaxed employing the dewaxing aid of this invention, although heavy feedstocks are preferred. Illustrative but non-limiting examples of such stocks are (a) distillate fractions that have a boiling range within he broad range of from about 250° to 700° C., with preferred stocks including lubricating oil and specialty oil fractions boiling within the range of from between about 300° and 650° C. and (b) bright stocks and deasphalted resids having an initial boiling point above about 425° C. Additionally, any of these feeds may be hydrocracked prior to distilling or deasphalting. These may come from any source such as paraffinic crudes obtained from Aramco, Kuwait, the Panhandle, North Louisiana, etc., naphthenic crudes, such as Tia Juana, Coastal crudes, etc., as well as the relatively heavy feedstocks such as bright stocks having a boiling range of 565+° C. and synthetic feedstocks derived from Athabasca tar sands, Cold Lake crude, coal, etc.

The Dewaxing Process

A solution of dewaxing aid dissolved in an appropriate solvent such as a light heating oil or a light mineral oil fraction is mixed into the wax-containing oil and the mixture heated to a temperature higher than the cloud point of the oil (about 50° to 120° C.). This mixture is introduced, along with the dewaxing solvent, into a chilling zone and chilled to a temperature necessary to yield the desired pour point for the resulting dewaxed oil. The chilling produces a slurry comprising dewaxed oil and solvent along with solid particles of wax which contain the dewaxing aid. This slurry is then sent to a wax filter to separate the dewaxed oil and solvent from the wax particles.

The ratio of solvent to waxy oil would generally range from about 0.5 to 10 and preferably from 0.5 to 3.0 volumes of solvent per volume of oil. The optimum amount of dewaxing solvent employed is of course determined by the wax content of the oil, viscosity, pretreatment and dewaxing conditions.

The dewaxing aid is added to the waxy oil feed in an amount ranging from about 0.01 to 0.50 wt. % and preferably from about 0.02 to 0.2 wt. % of the oil.

Other dewaxing aids, each in similar amounts i.e. 0.01 to 0.50 wt. %, preferably 0.02 to 0.2 wt. %, based on the weight of oil may also be added. Acryloid 150 which is a methacrylic acid ester polymer is frequently used as such a co-dewaxing aid, e.g. see U.S. Pat. No. 4,377,467, and has been found particularly useful with the fumarate-vinyl acetate copolymers of the invention.

The invention will be further understood by reference to the following examples.

EXAMPLES

A copolymer of behenyl fumarate and vinyl acetate having a Specific Viscosity of 3.0 when measured at a concentration of 2 wt. % polymer in 98 wt. % xylene at 40° C. was prepared as follows:

Behenyl fumarate (456 g), vinyl acetate (148 g), and cyclohexane (372 g) are charged to a resin kettle and sparged with nitrogen. The mixture is heated under a nitrogen blanket to 75° C. with stirring until it is completely dissolved. Benzoyl peroxide (0.43 g) in ethyl acetate (~10 g) is sparged with nitrogen and added to the mixture. After six hours the behenyl fumarate is completely consumed and the reaction is quenched with 2,6-di-tert-butyl cresol (0.40 g). The yield of polymer based on behenyl fumarate is 98%.

The above polymer, along with polymers of Specific Viscosity of 0.3, 2.2, and 4.9 were tested in the propane dewaxing of a 600 Neutral Oil (600 SUS viscosity at 100° C.) under conditions simulating commercial plant operation. The oil was diluted with 1.4 to 1.6 volumes of propane per volume of oil. The fumarate-vinyl acetate copolymer was added at a treat rate of 0.03 wt. % active ingredient (a.i.) of copolymer, based on the weight of the oil. Acryloid 150 was also added as a co-dewaxing aid at a treat level of 0.040% a.i., based on the weight of oil. The test results are summarized in the following Table 1.

TABLE 1

EFFECT OF BEHENYL FUMARATE-VINYL ACETATE MOLECULAR WEIGHT ON DEWAXING PERFORMANCE

| Specific Viscosity | Feed Filter Rate ($m^3/m^2/d$) | Dewaxed Oil Yield (%) |
|---|---|---|
| 0.3 | 9 | 59 |
| 2.2 | 9 | 64 |
| 3.0 | 39 | 73 |
| 4.9 | 32 | 71 |

As seen by the above data, the higher Specific Viscosities gave a much more rapid filtration rate (and a higher yield of dewaxed oil. Filter rates of 39 cubic meters per square meter of filter surface per day ($m^3/m^2/d$) were obtained at 3.0 Specific Viscosity which appeared about optimum with this oil.

What is claimed is:

1. A copolymer of dialkyl fumarate and vinyl acetate suitable for use as a dewaxing aid in wax containing oil wherein the improvement comprises said copolymer having a Specific Viscosity measured at 2 wt. % solution in xylene at 40° C. of at least 2.5, and wherein 50 to 100 wt. % of said alkyl groups are $C_{20}$ to $C_{24}$ alkyl groups.

2. The copolymer according to claim 1, wherein said dialkyl fumarate is behenyl fumarate.

3. The copolymer according to claim 2, wherein said Specific Viscosity is 2.7 to 6.

4. The copolymer according to claim 3, wherein said Specific Viscosity is about 3.

* * * * *